(12) United States Patent
Vandenburgh et al.

(10) Patent No.: US 8,230,011 B2
(45) Date of Patent: Jul. 24, 2012

(54) NETWORKED COMPUTER ALERT SYSTEM

(76) Inventors: John Vandenburgh, Murrieta, CA (US); Niki Vandenburgh, Murrieta, CA (US)

( * ) Notice: Subject to any disclaimer, the term of this patent is extended or adjusted under 35 U.S.C. 154(b) by 524 days.

(21) Appl. No.: 12/146,598

(22) Filed: Jun. 26, 2008

(65) Prior Publication Data

US 2009/0219146 A1 Sep. 3, 2009

Related U.S. Application Data (60) Provisional application No. 61/033,330, filed on Mar. 3, 2008.

(51) Int. Cl.
G06F 15/16 (2006.01)
(52) U.S. Cl. ........ 709/204; 709/203; 709/202; 709/205; 709/206
(58) Field of Classification Search .......... 709/204, 709/202, 203, 205, 206
See application file for complete search history.

(56) References Cited

U.S. PATENT DOCUMENTS

| | | | |
|---|---|---|---|
| 6,275,855 B1* | 8/2001 | Johnson | 709/224 |
| 7,266,776 B2 | 9/2007 | Quillen | |
| 7,366,897 B2 | 4/2008 | Noble | |
| 2002/0116247 A1* | 8/2002 | Tucker et al. | 705/8 |
| 2003/0062997 A1* | 4/2003 | Naidoo et al. | 340/531 |
| 2003/0208543 A1 | 11/2003 | Enete et al. | |
| 2004/0225681 A1* | 11/2004 | Chaney et al. | 707/104.1 |
| 2005/0235360 A1* | 10/2005 | Pearson | 726/23 |
| 2006/0046756 A1* | 3/2006 | Kies | 455/518 |
| 2006/0174028 A1* | 8/2006 | Zhu | 709/232 |
| 2006/0178028 A1* | 8/2006 | Swiatek et al. | 439/215 |
| 2006/0271633 A1* | 11/2006 | Adler | 709/206 |
| 2008/0048851 A1* | 2/2008 | Reyes et al. | 340/506 |
| 2008/0168047 A1* | 7/2008 | Chatterjee | 707/5 |
| 2008/0168048 A1* | 7/2008 | Bell et al. | 707/5 |
| 2008/0291849 A1* | 11/2008 | Ostermeier et al. | 370/270 |
| 2009/0122761 A1* | 5/2009 | Hughes | 370/331 |
| 2009/0224966 A1* | 9/2009 | Boling et al. | 342/357.1 |
| 2009/0235084 A1* | 9/2009 | Ferraro et al. | 713/182 |
| 2010/0066530 A1* | 3/2010 | Cohn et al. | 340/500 |

* cited by examiner

*Primary Examiner* — Lan-Dai T Truong
(74) *Attorney, Agent, or Firm* — Mark Wisnosky (57) ABSTRACT

An alert system for users of networked computers is described. The alert system includes local software installed on the user's personal computing device, such as personal computers, cell phones and personal data assistants as well as server software. The system allows for both anonymous and non-anonymous rapid communication from the user upon a triggering event of harassment or other actions while accessing the Internet using the personal computing device. The system includes flexible and customizable communication to a variety of pre-selected recipients by a variety of communication means.

13 Claims, 8 Drawing Sheets

NETWORKED COMPUTER ALERT SYSTEM

CROSS-REFERENCE TO RELATED APPLICATIONS

This application claims the benefit of U.S. Provisional Patent Application 61/033,330, filed Mar. 3, 2008, entitled, "Networked Computer Alert System", currently pending, by the same inventors, and, incorporated by reference.

TECHNICAL FIELD

The present invention relates to a system that allows a user to alert others of inappropriate behavior while using a networked computer.

RELATED BACKGROUND ART

The internet has grown to be the place for communication, socialization and study for the majority of the school age children in the United States. Along with the explosive legitimate use of the internet a dark, even criminal side, has also developed. The communication across networked computers has included teasing harassment and predatory behavior. The anonymity provided by the internet has emboldened those who misuse the internet to escalate the practice and the boldness of such attacks. Harassment over the internet often called cyber bullying has taken on many different forms. In some cases the attacks may start as teasing that escalates out of hand. In some cases the attacks have resulted in serious psychological harm. Cyber bullying has been attributed as a main cause in a few cases of young adult suicides.

In addition to cyber bullying, sexual solicitation using the anonymity of the internet is also common. A 1999 U.S. Congressionally sponsored study of children's use of the internet conducted through the University of New Hampshire has found that:

Approximately one in five children have received a sexual solicitation or approach over the Internet in the last year.
One in seventeen was threatened or harassed.
Less than 10% of sexual solicitations and only 3% of unwanted exposure episodes were reported to authorities such as a law enforcement agency an Internet service provider or a hotline. About one quarter of the youth who encountered a sexual solicitation or approach told a parent.

(Source: Finkelhor, David; Mitchell, Kimberly J.; Wolak, Janis. *Online Victimization: A report on the Nation's Youth*. University of New Hampshire's Crimes Against Children Research Center, June 2000, Incorporated by reference).

There are a few internet resources for reporting harassment such as the CyberTipline (www.cybertipline.com, visited Mar. 2, 2008). However these resources are frequently not known as the study referenced above indicates and are not automated requiring extraordinary action on the part of the computer user.

There is a need for a simple, quick and easy to use method for a user to report online harassment. There is a need for a system that would allow the user to report the harassment both anonymously to encourage more reporting and not anonymously to seek help in dealing with the situation. There is a need for a resource to allow a user to report the details of an event immediately after or even while the event is happening. There is a need for a resource that will allow parents and authorities to gather information, evidence and statistics on the prevalence of online harassment and abuse of computer users.

DISCLOSURE OF THE INVENTION

A computer resource in the form of software that includes programs running locally to produce a tool bar or menu bar icon that immediately notifies a pre-selected list of people of a harassment event and server based messaging is described. The resource includes software that enables a communication routine for pre-planned communication of harassment prior to the event occurring as well as real time reporting of harassment even while the harassment is taking place. The resource includes both locally installed software as well as software running on a server to support the process. Embodiments of the invention include multiple communication paths non-limiting examples include both e-mail and text messaging of an alert to a pre-selected receiver list. The list of those who receives messages and the nature of the message sent can be customized for each installed user of the resource. Embodiments of the invention include both anonymous reporting of an event as well as reporting that can identify the source of the message. In one embodiment the message may be pre-selected or pre-written and sent with a simple click of a toolbar icon. In another embodiment the computer use may be prompted to provide additional details of the event. In another embodiment the details of the event may be automatically collected and forwarded to authorities. Details may include date and time of the harassment event and identification of the computer user source of the message. In another embodiment further computer and network parameters may be gathered and forwarded with the message providing a time and date stamped evidence file of a harassing or abusive event.

DETAILED DESCRIPTION

Figure 1:
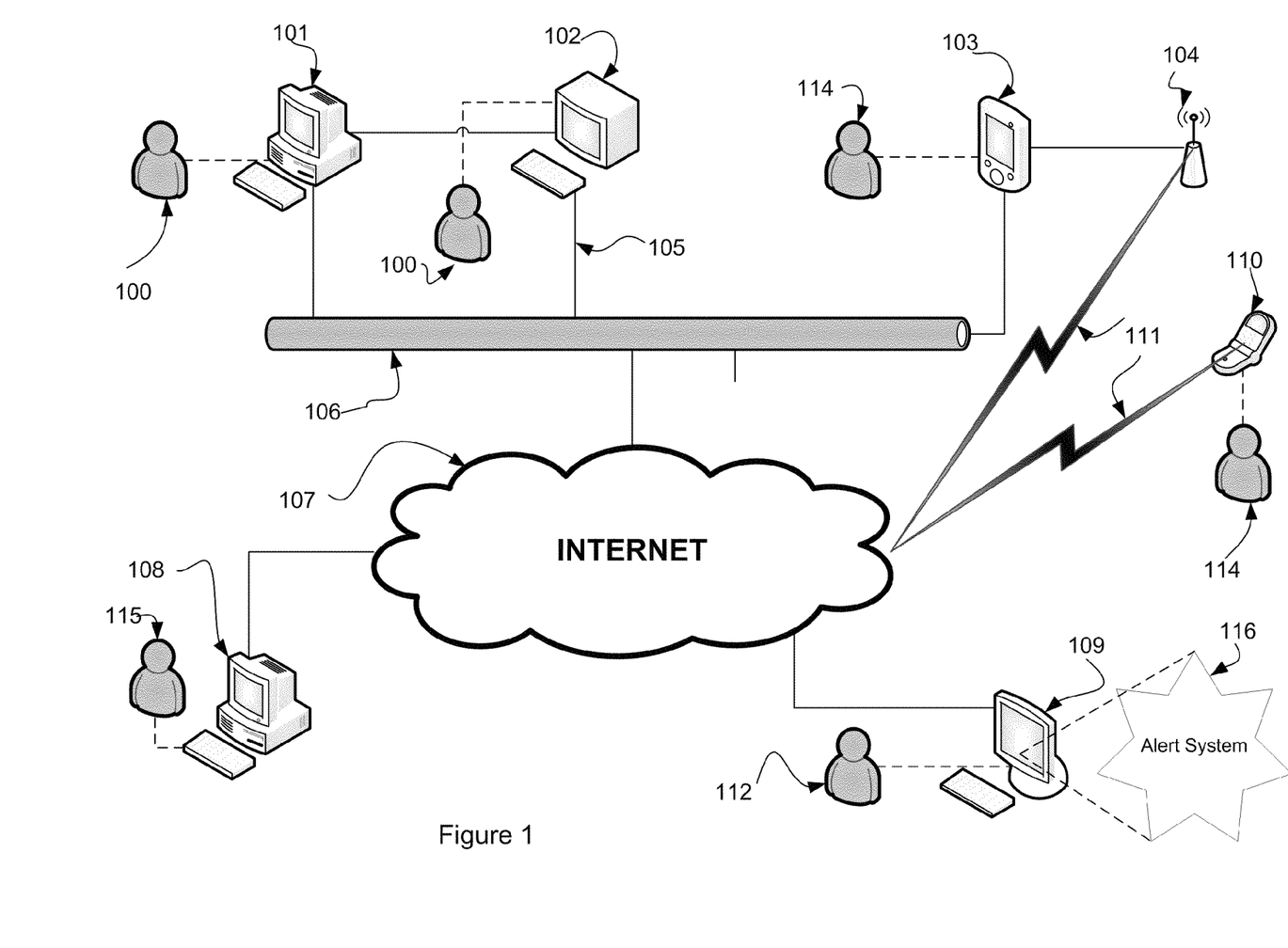
FIG. 1 is a schematic view of networked a computer system in which the invention may be practiced.

FIG. 1 shows a networked computer system in which embodiments of the invention may be practiced. Users 100 may be accessing a computer network on a local network system 106 or over the world wide web network 107. Other users 115 may access the network through computers 108 tied to the network by means other than the local network connection. The network may be accessed using personal computers 101 or terminals 102 or other personal computing devices such as personal digital assistants 103 or cell phones 110. The connection to the network may be via a hard-wired connection 105 or through wireless transmitters 104 and connections 111. The invented program has components that run on the personal computers 101, 102, 108 or personal digital assistants 103 or cell phones 110 or other personal computing devices, as well as communication routines 116 that run on a communication server dedicated to the invention 109. A system administrator 112 may access and support the software running on the server. In one embodiment the communication path of alert messages is from the individual user systems 101, 102, 108 through the dedicated server 109 and out to users pre-selected to receive the alert message. The message may be received on individual user systems 101, 102, 108 or on other communication devices 103, 110. Recipients of the alert messages may be users 100 connected to the network system or others 114 who are connected through non-pc means such as PDA's and cellular telephones. The communication uses existing communication means, not shown, of the internet such as internet service provider e-mail systems and text messaging such as provided by short message services (SMS).

Figure 2:
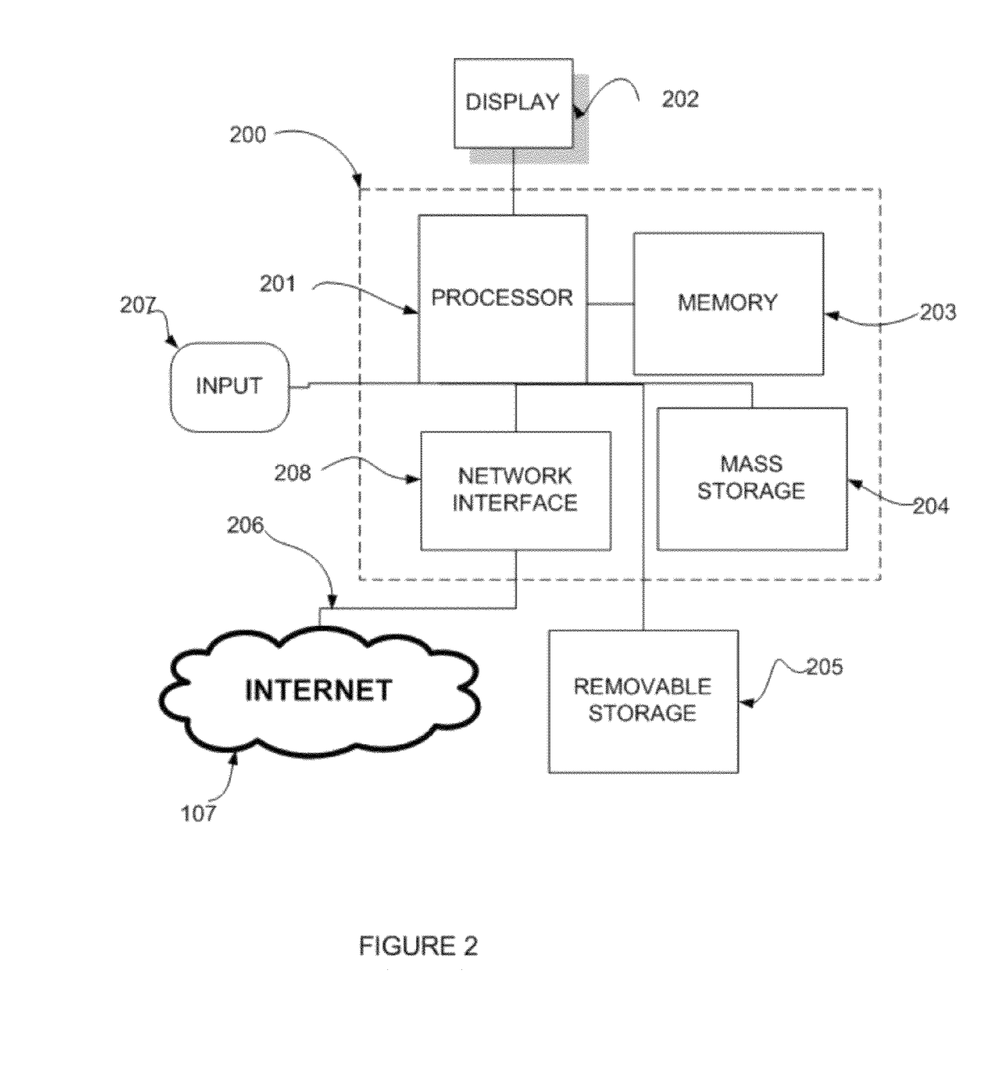
FIG. 2 is a schematic diagram of a personal computing device system upon which the invention may be practiced.

FIG. 2 shows more detail of a personal computing device 200 on which the invention may be practiced. The system includes input means 207, typically a keyboard and mouse or other pointing device connected to a processor that has access to both local memory 203 such as RAM and ROM, which may provide either volatile or nonvolatile storage. Typical systems will include a mass storage device 204 that is usually a hard disc drive and a means 205 to read and write from and to removable storage media such as magnetic or optical. Smaller devices such as cell phones and PDA's often will include only solid state memory components. Feedback to the user is provided by a display means 202 such as a liquid crystal display. Embodiments of the invention may be written and accessed when stored in memory directly integrated to the processor 201 or other memory locations 203, 204 and 205. The system further includes a network interface 208 that is connected 206 to the internet 107. Connection means 206 may be wired or wireless. In another embodiment the invention may be practiced on any computing device that may be connected to the internet Non-limiting examples of such devices include networked games, personal data assistants and cell phones. Personal computers and other devices such as PDA's and cell phones on which the invention may be practiced are referred to hereinafter as personal computing devices.

Figure 3:
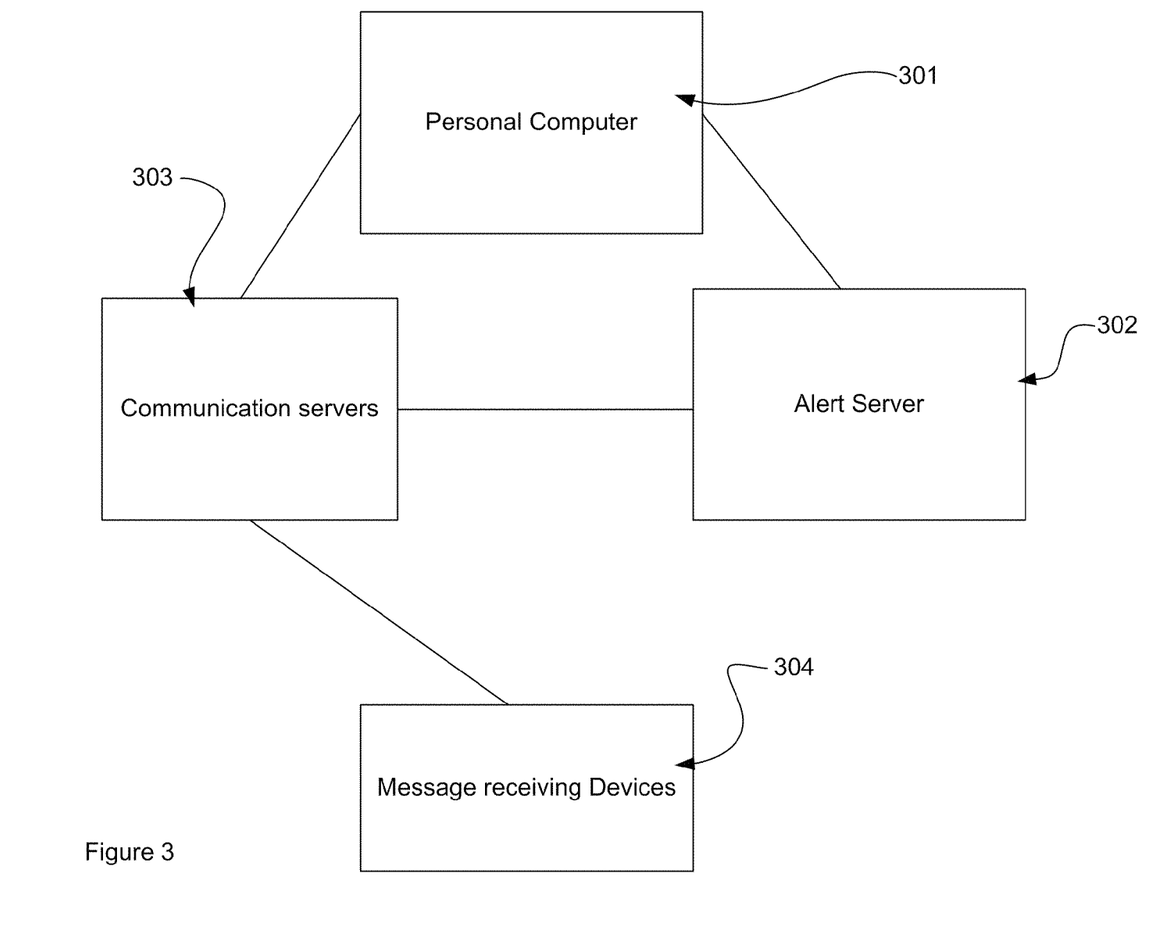
FIG. 3 is a schematic block diagram showing the overall structure of the invented resource.

FIG. 3 provides further clarification of the components and distributed nature of embodiments of the invention. A personal computing device 301 includes localized software of the invention that provides an icon based alert system discussed in detail below that communicates to a dedicated alert server 302. This alert server is accessed only by administrators of the invented program to maintain confidentiality of users during the alert process. The alert server communicates to the rest of the world through communication servers 303 such as provided by internet service providers well known in the art. The communication servers send messages including alert messages to personal computing devices 301 and to other message receiving devices 304 such as cell phones and PDA's. In another embodiment that does not make full use of the security of the alert server, alert messages may be sent directly from the personal computing device 301 through communication servers 303 to receivers located on personal computing devices 301 or other devices 304.

Figure 4:
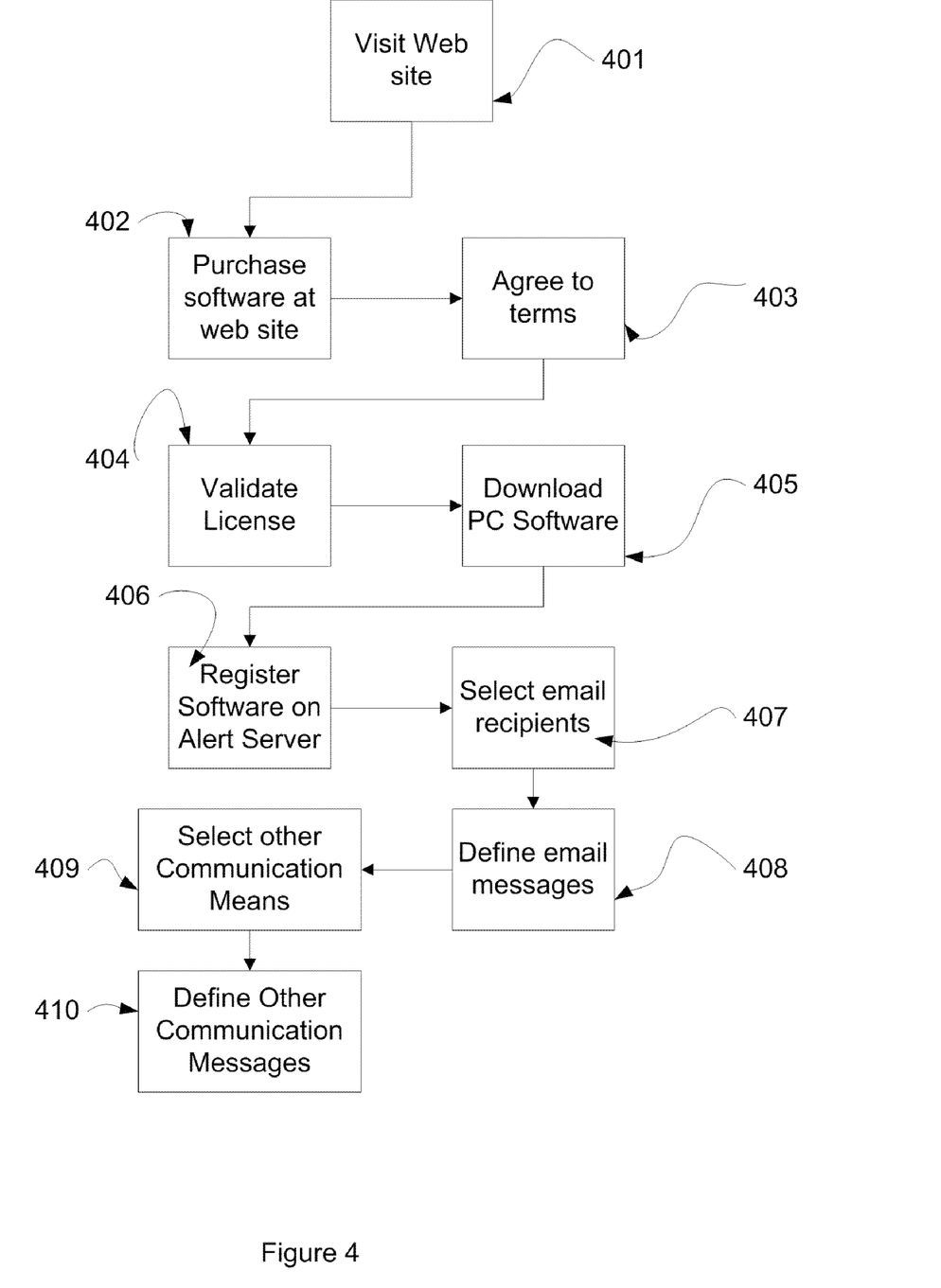
FIG. 4 is a schematic flow chart showing a purchase and setup embodiment of the invention.

FIG. 4 illustrates an initial setup embodiment of the invention. A user may visit a web site 401 that provides access to the software application. The web site 401 may be located on the alert server or on other servers attached to the same network as the user. The user initiates a purchase procedure 402 of the software that includes agreement to the terms 403 and provides a license that is validated in a subsequent step 404. Agreement to the terms 403 is a more robust system than the typical click agreement to a software license as it also includes a communication of the limits of the system as to what may communicated and to whom and how subsequent action may be expected or limited as part of a user initiated alert. In a preferred embodiment the invention communicates only an alert message to pre-selected recipients and does not provide a warranty of any action in response to an alert. Once a license is validated. A local embodiment of the invention is downloaded 405 to the users personal computing device. In one preferred embodiment activation of the software requires registration of the software on the Alert Server 406. Registration may be as a single user or as a group of users with analogous alert protocols. Non-limiting examples of a group of users may be members of a common family, users who attend a common school, who attend a common church, who reside in a particular community, who access the internet through a common communication routine or who are common users of a particular software system. In one embodiment the registration step 406 also includes definition and acceptance of data collection protocols that may be initiated when a user sends an alert. In one embodiment the registering user then selects or inputs 407 a set of email recipients. In another embodiment this selection step may be done once for a group of users and subsequent registering users would skip this step 407. One embodiment includes a definition step 408 to provide a custom message that would be sent to the selected email recipients. In another embodiment the messages may be customized for each of the recipients. In another embodiment the messages may be defined for a group of users and the definition step 408 is completed only once for the group and subsequent registering users would skip definition step 408. Another embodiment includes selection of additional communication means 409 and the definition of the associated messages 410. One embodiment includes selection of text messages to be sent to recipients identified by their telephone numbers. Another embodiment may include other message types such as pre-recorded voice messages that may be sent telephonically. The definition and customization of the other communication means include analogous steps to those defined above for an email alert. In another embodiment the other communication means definition steps 409, 410 may be customized for individual users even though previous steps were common to a group of users. In another embodiment any of a particular communication means may be selected as providing a common message for a group of users and other means may be selected as providing specific communication for a particular user. In another embodiment messages may be customized of groups of recipients. That is, a group of recipients may receive a common message whereas other recipients may receive customized messages. In one such embodiments parents of a user may receive a customized messages for an alert initiated by their children whereas other recipients such as educators, law enforcement or others who have registered and allowed access to gather non-user-identifiable information may receive a more generic message only that an alert has been initiated without identification of the user who initiated the alert. In another embodiment the communication setup allows communication to a database to compile information about alert events. Other combinations of custom and non-custom messages pre-selected for users and recipients are possible as now enabled and falling within the spirit of the present invention.

Figure 5A:
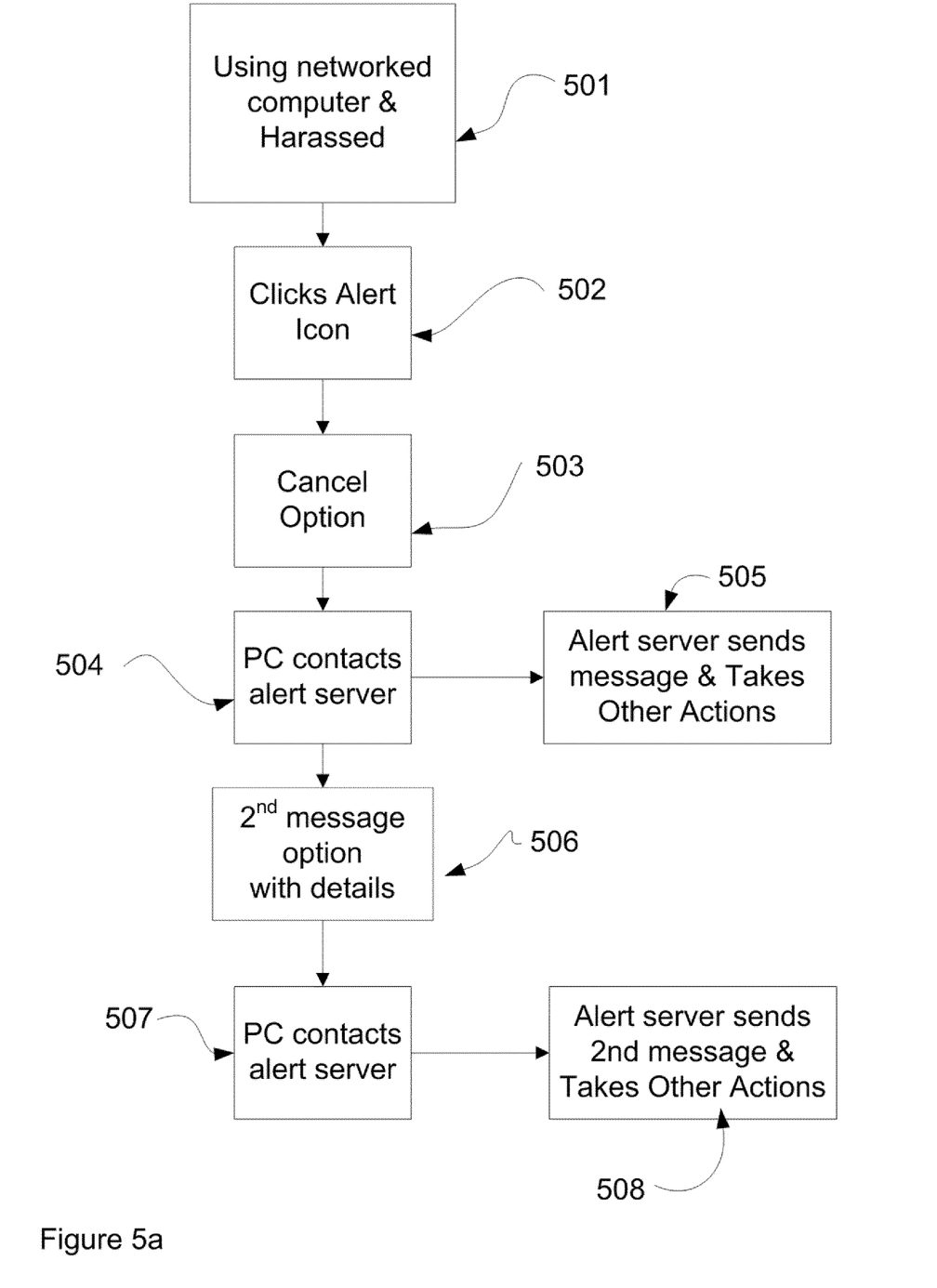
FIG. 5a is a schematic flow diagram showing an embodiment of sending an alert using the invented resource.

Embodiments of using the installed alert system are shown in FIG. 5*a*. The process begins when someone is using a networked computer and is being harassed in some fashion 501. As described in the introduction harassment may take many forms. Non-limiting examples include direct approaches to the user, posting defamatory information about the user, objectionable pop-up pages, and contact from stalkers. The user wants to send an alert and clicks on the alert icon 502. In a preferred embodiment the icon is always visible to the user when using the computer on which the software has been installed. In one embodiment a cancel option 503 is available in case the user accidentally clicks on the icon and does not want to send an alert message or otherwise decides not to send a message. If not canceled the users PC will then contact the alert server over the network to indicate the user has activated the icon and the alert server will then send the pre-selected messages to the pre-selected recipients 505. In another embodiment the server will also add the alert to a compiled database of alert events. In another embodiment the user may then be further prompted 506 with the option to send a second message with additional details about the situation that prompted the alert. In one embodiment the user writes the second message at the time of the alert. In another embodiment the second message may be a pre-selected second message with a second pre-selected recipient group. In another embodiment the second message may be an escalation of the alert to a different group. In one embodiment the second message is an escalation to law enforcement. Once the second message is initiated and defined the users PC contacts the alert server 507 and the alert server sends the $2^{nd}$ message 508. In another embodiment the server will also add the second alert to a compiled database of alert events. An advantage of using a dedicated intermediate server as described is that the source of the alert message may be cloaked from the recipient of the message. In one embodiment the message is sent anonymously. In another embodiment the message is sent anonymously to a select group of recipients and non-anonymously to other recipients. In another embodiment the alert includes a second or multiple messages sent sequentially. In another embodiment the first of a series of messages is sent anonymously and the second or subsequent message is sent non-anonymously.

Figure 5B:
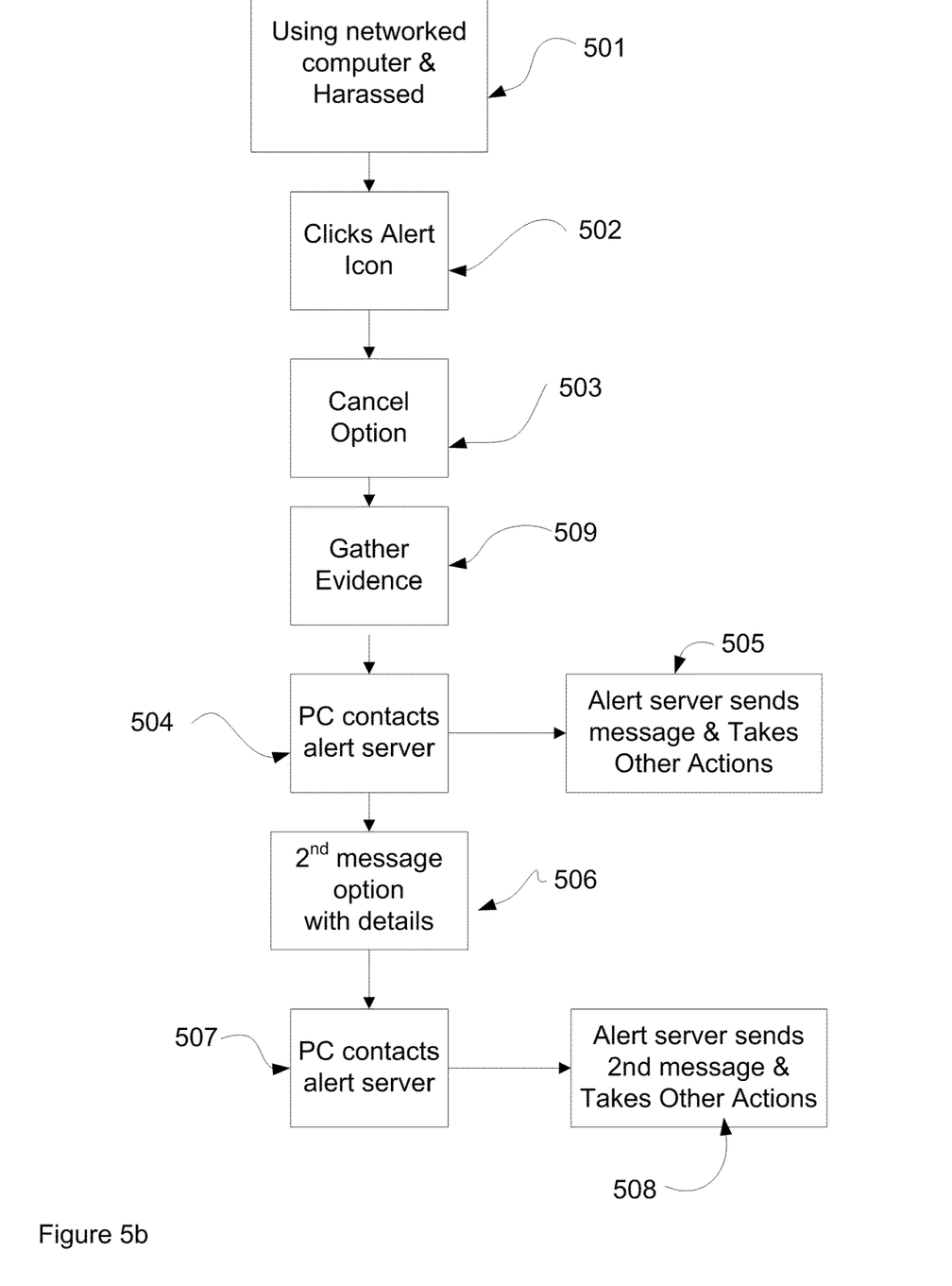
FIG. 5b is a schematic flow diagram of another embodiment.

In another embodiment shown in FIG. 5*b* there is added a step 509 where evidence is gathered regarding the harassment. In one embodiment the evidence is a captured image of the screen at the time the alert icon was triggered. In another embodiment the evidence may further include URLs of linked web site and a log of activity taking place on the users computer. The evidence may be stored locally or on a remote server. In another embodiment the evidence may be transmitted with the alert message. In another embodiment the evidence is transmitted only to a select recipient or recipients of the alert message.

Figure 6:
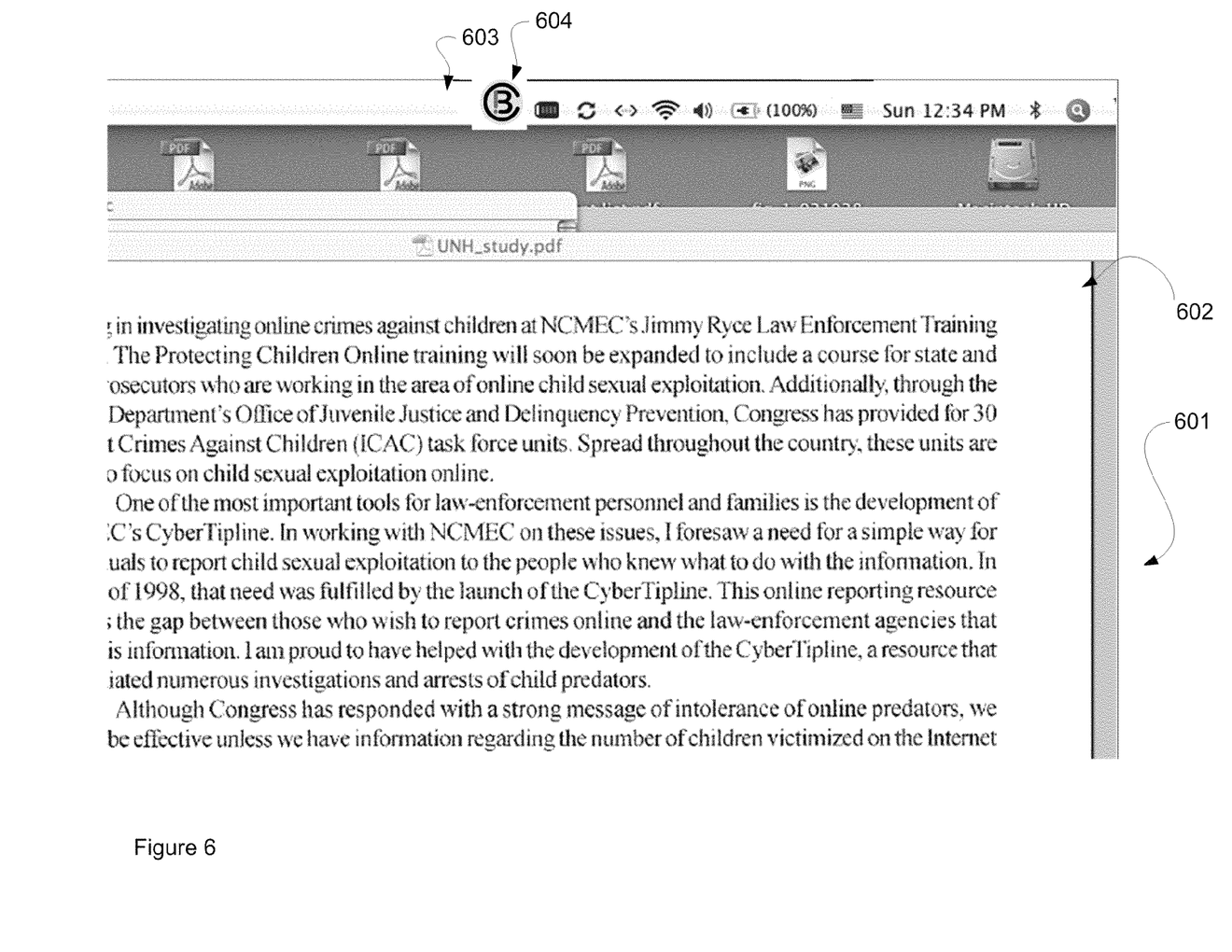
FIG. 6 is a screen image showing a tool bar icon embodiment of the invention.
Figure 7:
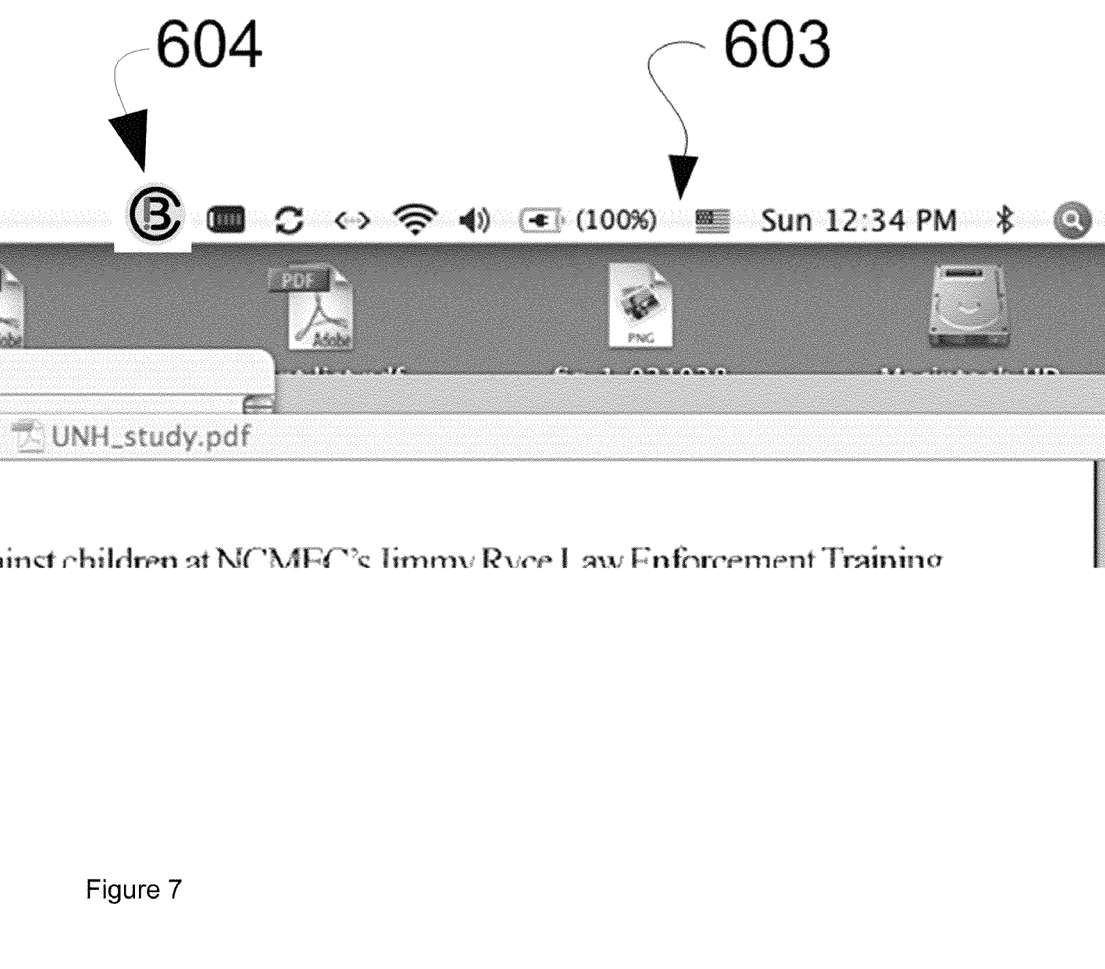
FIG. 7 is an expanded view of FIG. 6.

A graphic embodiment of the invention is shown in FIGS. 6 and 7. A typical computer user's screen 601 will include multiple windows 602 of active programs. Active programs would include depiction of files that are being read, modified, communication programs and others. The screen presented by most popular operating windows including Windows® and Apple's Macintosh OS® include a toolbar 603 on which is displayed multiple icons that the user has selected to be visible. The toolbar may be used for icons that the user wants to have readily available for accessing programs and may also include indicators of the computer or associated network performance. An embodiment of the invention includes an alert icon 604 that the user may activate by pointing to it and clicking. FIG. 7 shows an expanded view of just the toolbar section of the screen.

In another embodiment a tangible storage medium is encoded to contain software to provide the alert system. The storage medium may be a compact disc medium or a digital video medium or similar such storage means know in the art. The local user software may then be copied from the tangible storage medium and installed on the user's computer.

CONCLUSIONS

An alert system for users of networked computers is described. The alert system includes local software installed on the user's personal computing device, such as personal computers, cell phones and personal data assistants as well as server software. The system allows for both anonymous and non-anonymous rapid communication from the user upon a triggering event of harassment or other actions while accessing the Internet using the personal computing device. The system includes flexible and customizable communication to a variety of pre-selected recipients by a variety of communication means.

Those skilled in the art will appreciate that various adaptations and modifications of the preferred embodiments can be configured without departing from the scope and spirit of the invention. Therefore, it is to be understood that the invention may be practiced other than as specifically described herein, within the scope of the appended claims.

The invention claimed is:

1. A computer alert system for reporting on-line harassment, said computer alert system comprising:
 a) a personal computing device operated by a user;
 b) local alert software installed on the personal computing device, said local alert software capable of being activated by said user by clicking on a unique onscreen icon, such as when said user judges that at least one current activity on the personal computing device has been subjected to on-line harassment, the user immediately clicks on the unique onscreen icon to collect current electronic evidences of the on-line harassment, wherein the electronic evidence is a captured image of the user personal computing device screen at the time the unique onscreen icon was triggered;
 c) a dedicated alert server computer;
 d) a communication software installed on the dedicated alert server computed;
 e) wherein the activation of the local alert software by the user causes the local alert software to immediately collect and store electronic evidences of the on-line harassment event resident on the personal computing device and causes the communication software to send a predefined alert message to a predefined list of recipients anonymously.

2. The alert system of claim 1 where the alert message is sent anonymously.

3. The alert system of claim 1 further comprising a second alert message sent after a first alert message to a second list of predefined recipients.

4. The alert system of claim 3 where the second alert message is sent to at least one recipient anonymously.

5. The alert system of claim 1 where the electronic evidence collection and storage includes a screen image capture.

6. The alert system of claim 1 where the communication software sends an e-mail.

7. The alert system of claim 1 where the communication software sends an instant message.

8. The alert system of claim 1 further comprising a confirmation step requiring said user to confirm their intent to activate the alert software before activating said local alert software.

9. A non-transitory storage medium encoded to contain software instructions for reporting on-line harassment, said software instructions when executed by a computer alert system causes the computer alert system to implement a method comprising:

a) controlling a user's personal computing device by a local software, said local software capable of being activated by said user by clicking on a unique onscreen icon, such as when said user judges that at least one current activity on the personal computing device has been subjected to on-line harassment, the user immediately clicks on the unique onscreen icon to collect current electronic evidences of the on-line harassment; wherein the electronic evidence is a captured image of the user personal computing device screen at the time the unique onscreen icon was triggered;

b) controlling a dedicated communication server by a communication software, said communication software installed in the dedicated communication server;

c) wherein the activation of the local software by the user causes the local software to immediately collect and store electronic evidences of the on-line harassment event resident on the personal computing device and causes the communication software to send one or more predefined alert messages to one or more predefined lists of recipients anonymously.

10. The non-transitory storage medium of claim 9 where evidence collection and storage includes a screen image capture.

11. The non-transitory storage medium of claim 9 where the communication software sends an e-mail.

12. The non-transitory medium of claim 9 where the communication software sends an instant message.

13. The non-transitory medium of claim 9 further comprising a confirmation step requiring said user to confirm their intent to activate the local software before activating said local software.

* * * * *